(12) United States Patent
Julien

(10) Patent No.: US 6,886,986 B1
(45) Date of Patent: May 3, 2005

(54) NITINOL BALL BEARING ELEMENT AND PROCESS FOR MAKING

(75) Inventor: Gerald J. Julien, Puyallup, WA (US)

(73) Assignee: Nitinol Technologies, Inc., Edgewood, WA (US)

( * ) Notice: Subject to any disclaimer, the term of this patent is extended or adjusted under 35 U.S.C. 154(b) by 186 days.

(21) Appl. No.: 10/069,384

(22) PCT Filed: Aug. 18, 2000

(86) PCT No.: PCT/US00/22742
§ 371 (c)(1),
(2), (4) Date: Feb. 19, 2002

(87) PCT Pub. No.: WO01/12359
PCT Pub. Date: Feb. 22, 2001

Related U.S. Application Data

(60) Provisional application No. 60/207,010, filed on May 25, 2000, provisional application No. 60/167,840, filed on Nov. 29, 1999, and provisional application No. 60/149,947, filed on Aug. 19, 1999.

(51) Int. Cl.$^7$ .............................. F16C 33/62; B21K 1/02
(52) U.S. Cl. ...................... 384/492; 384/565; 384/569; 384/912; 29/898.12; 29/898.14; 29/898.066; 29/898.068; 29/898
(58) Field of Search ............................... 384/492, 565, 384/569, 912, 907; 29/898.068, 898.069, 898.14, 899; 451/49, 50; 164/47, 477, 488, 129, 131; 420/417, 451

(56) References Cited

U.S. PATENT DOCUMENTS

| | | | |
|---|---|---|---|
| 1,472,922 A | * | 11/1923 | Lothrop |
| 2,231,556 A | * | 2/1941 | Arpin |
| 2,358,378 A | * | 9/1944 | Brenholtz |
| 3,422,663 A | * | 1/1969 | James et al. |
| 3,496,624 A | * | 2/1970 | Kerr et al. |
| 3,927,450 A | * | 12/1975 | Sommer et al. |
| 4,023,988 A | * | 5/1977 | Stickels et al. |
| 4,216,629 A | * | 8/1980 | DeGaeta |
| 4,302,256 A | * | 11/1981 | Kenton |
| 4,561,272 A | * | 12/1985 | Goldstein |
| 4,724,297 A | * | 2/1988 | Nielsen |
| 4,938,802 A | * | 7/1990 | Noll et al. |
| 5,843,152 A | * | 12/1998 | Tu et al. |
| 5,928,065 A | * | 7/1999 | Shih |
| 6,123,605 A | * | 9/2000 | Yano |

OTHER PUBLICATIONS

Civjan et al. "Potentiial applications of certain nickel–titanium (nitinol) alloys." J. Denst Res. Jan.–Feb. 1975, p. 89–96. Abstract.*

Selected Properites of NiTi. Niti Smart Sheet. 1999. http://www.sma–inc.com/NiTiProperties.*

Heat Treatmen of Steels—An Overview. http://www.azom.com/details.asp.*

* cited by examiner

Primary Examiner—Eric Compton
(74) Attorney, Agent, or Firm—J. Michael Neary

(57) ABSTRACT

A bearing having bearing elements made of Type 60 Nitinol made by an investment casting process for producing near net shape parts of Nitinol includes making a ceramic mold having a series of spherical cavities, pouring molten Nitinol into the mold cavities, cooling the mold and the Nitinol in the cavities to produce solidified Nitinol balls, and breaking the mold away from the Nitinol balls. Nitinol rods for roller bearings can be made by conventional casting directly from the crucible in a draw-down oven. The bars are hot machined or hot rotary swaged and then centerless ground and laser cut to length, or are first cut to length and then centerless ground individually for crowned roller elements. The balls are broken or cut from the risers, leaving the gates attached, and are consolidated by healing under pressure in a hot isostatic press, then ground to the desired size. The balls or rollers are polished, then treated to create an integral ceramic finish. They are then repolished to produce an extremely smooth finish. The balls can also be cut from a sheet or plate of the ball material as cubes or cylinders and processed in an abrasive tumbler to round off the corners and edges, and the rounded cubes or cylinders can hen be ground to spherical form in conventional ball grinder.

13 Claims, 10 Drawing Sheets

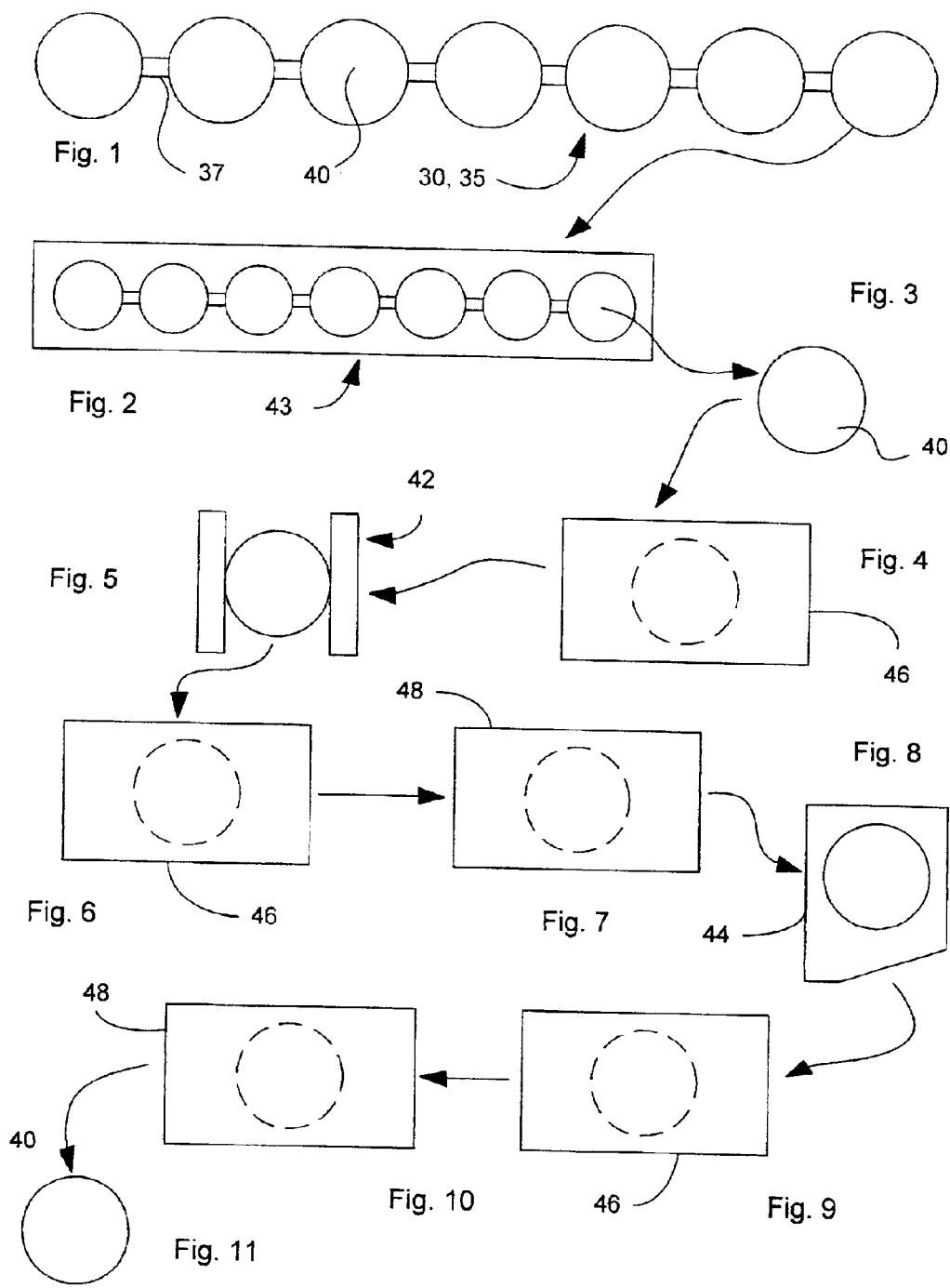

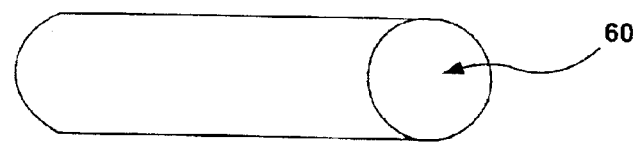
Fig. 12
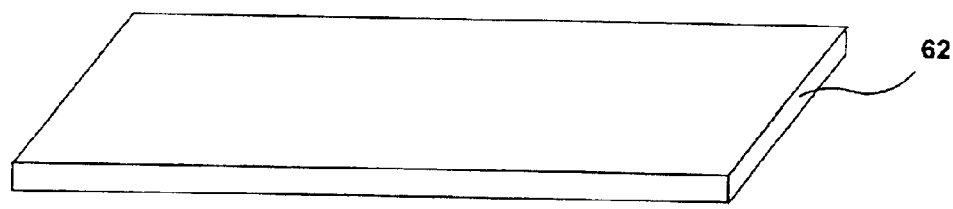
Fig. 13
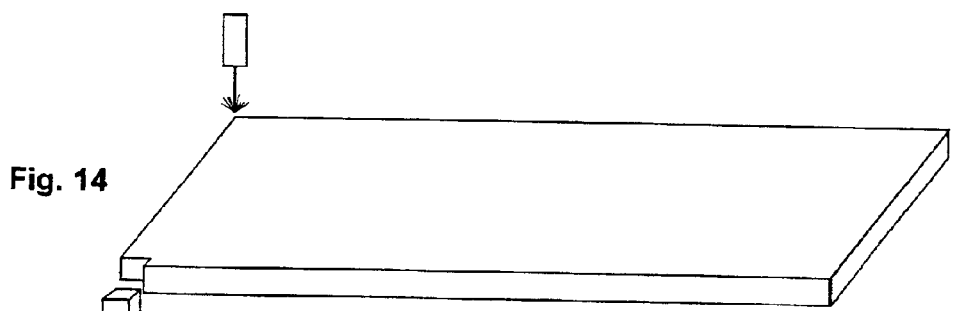
Fig. 14
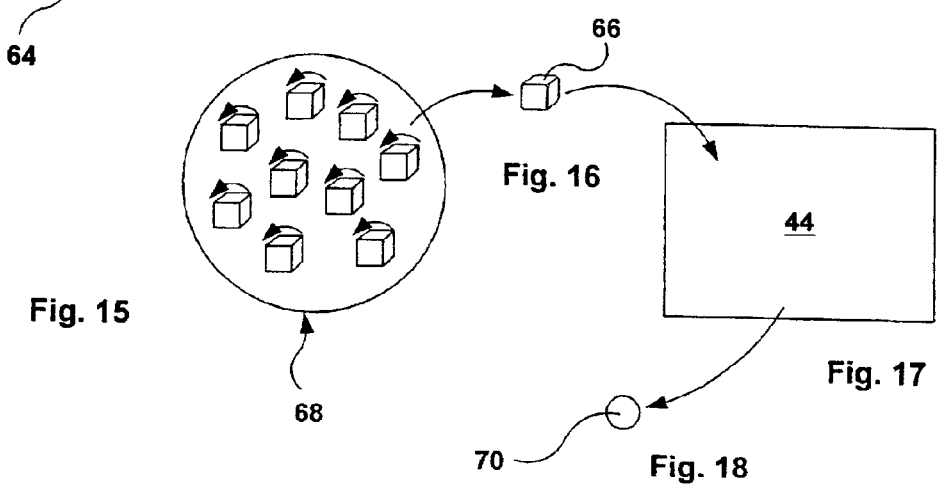
Fig. 15
Fig. 16
Fig. 17
Fig. 18

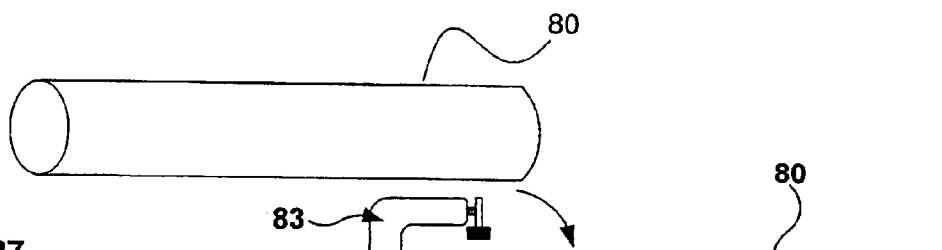
Fig. 27
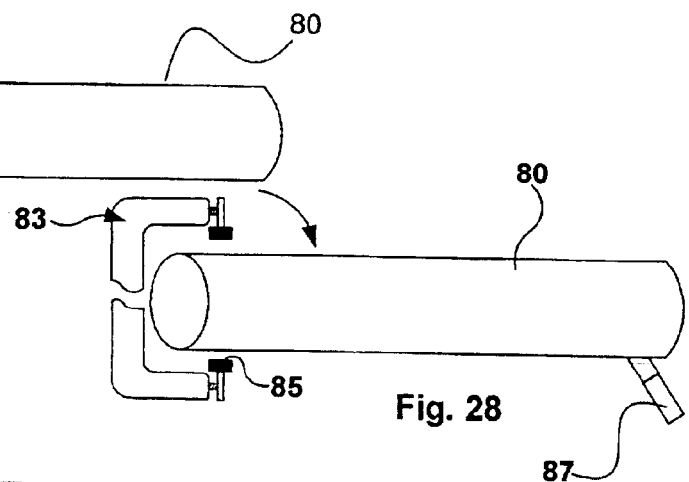
Fig. 28
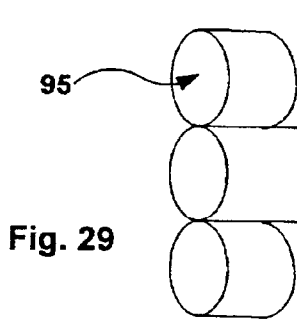
Fig. 29
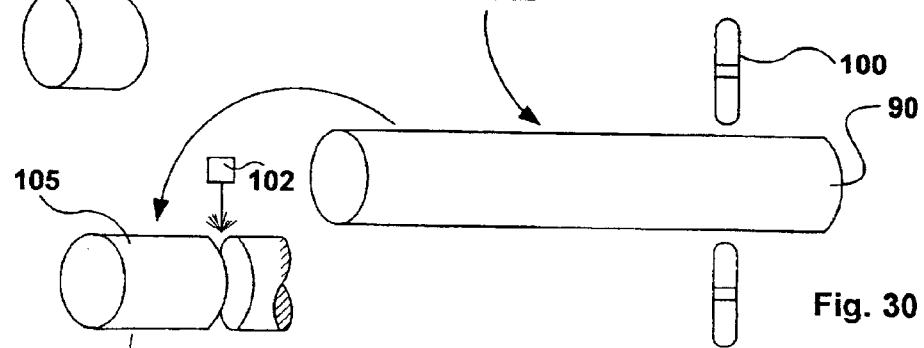
Fig. 30
Fig. 31
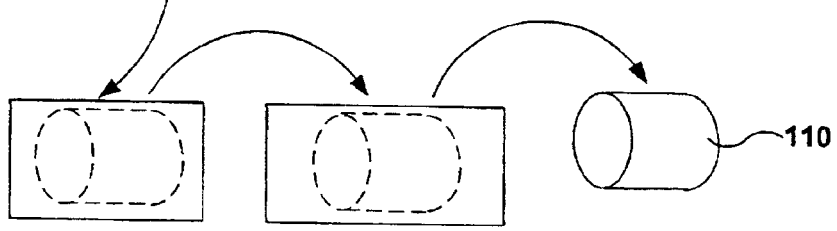
Fig. 32    Fig. 33
Fig. 34

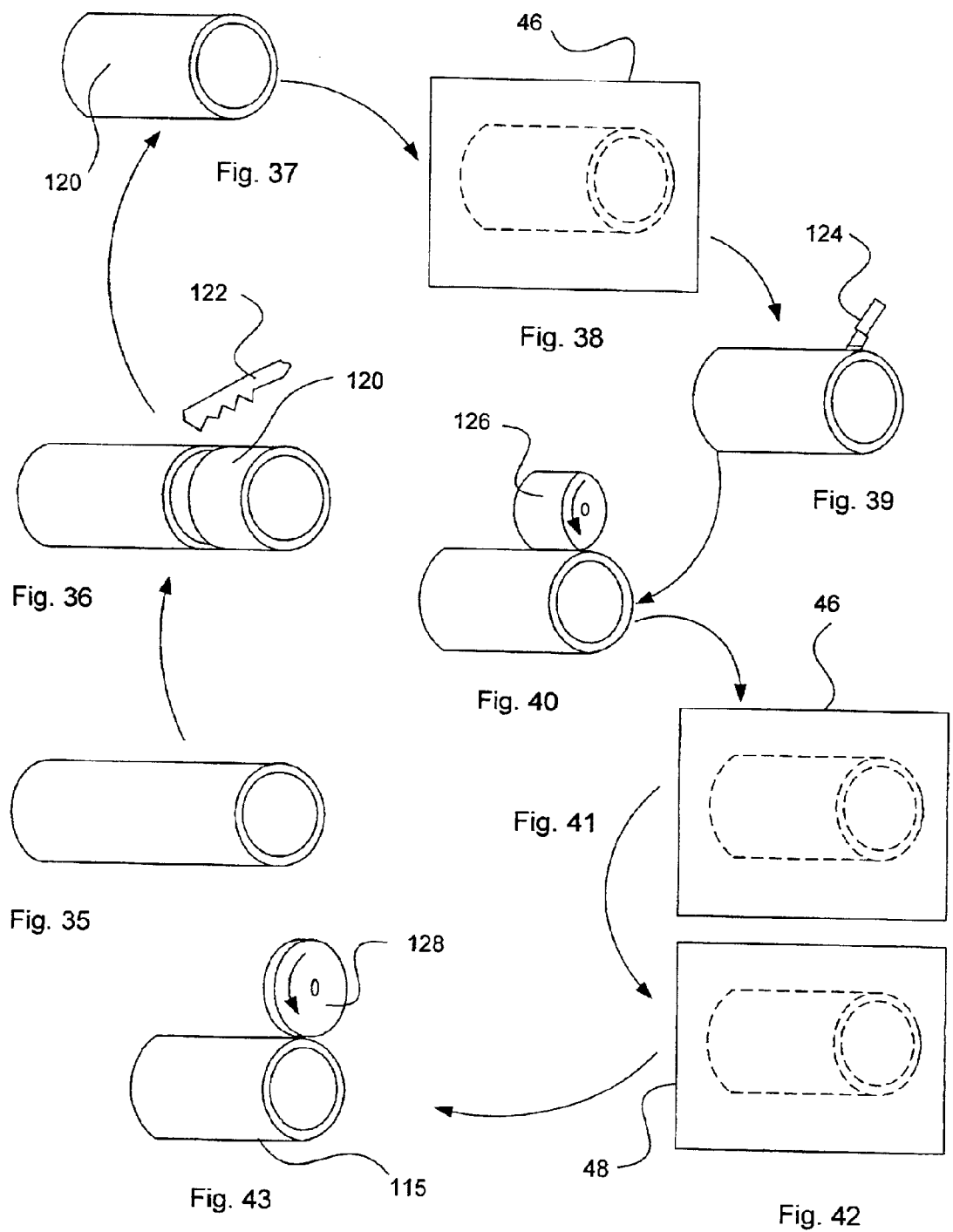

NITINOL BALL BEARING ELEMENT AND PROCESS FOR MAKING

This pertains to U.S. Provisional Application Nos. 60/149,947, filed on Aug. 19, 1999, and 60/167,840 filed on Nov. 29, 1999, and 60/207,010 filed on May 25, 2000, all entitled "Nitinol Bearings", and to PCT Application No. PCT/US00/22,742 filed on Aug. 18, 2000 published as International Publication No. WO 01/12359 Feb. 22, 2001, entitled "Nitinol Ball Bearing Element and Process for Making".

BACKGROUND OF THE INVENTION

Conventional "anti-friction" rolling element bearings have been available for many years made of numerous materials for numerous different applications. Their primary benefit, low starting friction, has earned them a permanent place in the phalanx of standard mechanical elements used in most products having moving parts, but they are notorious for a host of long-standing intractable problems. Steel, aluminum, brass, bronze, Monel, silicon nitride, plastics and ceramics are known materials used for their desirable properties in bearings, but all suffer from deficiencies that make their use in bearings less than ideal.

One of the most serious problems of conventional rolling element bearings is corrosion. Even though such bearings are normally used with a lubricant, which provides some degree of protection from corrosive agents, the lubricant can itself become contaminated with those corrosive agents. Even "sealed" bearings are designed to vent at low atmospheric pressure to avoid blowing out the seal, and then corrosive agents can be drawn into the bearing case when the atmospheric pressure returns to normal. Also, corrosive particles can become embedded in the surface of bearing elements and races which are softer than the particles, and the embedded corrosive particles cause rapid corrosive pitting of the bearing elements and races, resulting in early failure of the bearing.

Corrosion resistant rolling bearing elements and races have been developed, but all suffer from deficiencies. Most seriously, the corrosion resistant bearings are soft and have low strength, so even if the corrosion resistance they offer does actually allow the bearing to operate in a corrosive environment without corrosion, they have a limited life because of accelerated wear and fatigue sensitivity. Moreover, few of the so-called corrosion resistant bearings are really corrosion-proof. Corrosion pitting in a rolling bearing element or race results in early destruction of the bearing. Replacing corroded bearings reduces the availability of the equipment in which the bearings are used and greatly increases operating costs for replacement, maintenance and down time.

Bearings in equipment used in the food processing industry require particular scrutiny because of the danger of contamination of the food with metal particles, lubricant and the likelihood of failure because of corrosion resulting from use of chloride cleaners on the equipment. As a result, bearings used in food processing machinery are often made of soft "corrosion resistant" materials, but wear particles from such bearings are a constant source of concern and require continual costly maintenance and down-time to replace the short lived bearings.

Modern equipment often requires non-magnetic bearings. This requirement has been met in the past by non-magnetic materials such as brass and some stainless steels. However, these materials lack the strength of conventional steel bearings, so they must be designed over-sized to provide the needed load-carrying capacity. Moreover, most non-magnetic bearing materials are susceptible to corrosion and must be replaced frequently to avoid catastrophic failure from corrosion, resulting in costly and disruptive down-time for the equipment in which they are installed. Non-magnetic stainless steel is a fair solution to the problem, but the magnetic properties of stainless steel are not always predictable and can vary from batch to batch.

Ceramic rolling elements were thought to solve the magnetic and corrosion problems, and in fact are less susceptible to corrosion than the "corrosion resistant" metallic bearings. However, they have introduced their own unique set of deficiencies that make their use limited to a small segment of the market. They are very costly, so they are used only where there is no other alternative. They are fracture sensitive and fracture of a ceramic ball produces instantaneous failure of the bearing, so the equipment in which they are used must be designed to isolate the bearing from impacts. They are made of material that is very abrasive and can produce accelerated wear of the races and each other if allowed to rotate in contact with each other. They produce wear products and damage particles that cannot be detected by conventional equipment, so they are unsuitable for food machinery. They can be used in ceramic races, but ceramic races are also expensive and fracture sensitive. When ceramic balls are used in metallic races to reduce the fracture sensitivity of the bearing, the corrosion and magnetic problems solved by the ceramic rolling elements do nothing to solve the same problems with the races.

Nitinol is a nickel-titanium intermetallic compound invented at th Naval Ordinance Laboratory in the early 1960's. It is a material with useful properties, but manufacturers who have worked with it have had little success in making Nitinol parts and semi-finished forms, and have never attempted to make bearings of Nitinol. Because Nitinol is so extremely difficult to form and machine, workers in the metal products arts usually abandoned the effort to make products out of anything except drawn wire because the time and costs involved did not warrant the paltry results they were able to obtain.

Nitinol, particularly Type 60 Nitinol (60% Nickel and 40% Titanium by weight), has many properties that are unrecognized as of potential value in bearings. It can be polished to an extremely smooth finish, less than 1 microinch rms. It is naturally hard and can be heat treated to a hardness on the order of 62Rc or higher. It can be processed to have a very hard integral ceramic surface that can itself be polished to an even smoother surface than the parent metal. It is non-magnetic, immune to corrosion from most common corrosive agents, and has high yield strength and toughness, even at elevated temperatures. It is 26% lower density than steel for high revolution rate applications and for weight sensitive applications such as aircraft, satellites and spacecraft. However, there has hitherto been no attempt to make bearings out to Nitinol because it is so difficult to work, because it was known to be brittle, and because there has been no known method to make rolling elements and races out of Nitinol.

SUMMARY OF THE INVENTION

Accordingly, this invention provides a bearing having rolling elements and/or races made of Nitinol. The invention also provides efficient processes for making Nitinol bearing races, and for making balls out of Nitinol and other materials that are difficult or impossible to form. The Nitinol bearing elements, and the bearings made from these elements which this invention provides are capable of performance unmatched by the prior art. The bearings are non-magnetic, virtually corrosion-proof, impact tolerant and high strength. In addition, they appear to provide better damping capacity, run quieter, and to be less susceptible to spalling than steel bearings.

The invention includes making blanks for ball bearings and rods for roller bearings of Nitinol. Ball blanks can be made by casting balls or cutting cubes out of sheets of material of which the balls are to be made, preferably Type 60 Nitinol, although cubes can be cut from Stellite, nitrogen steel and even silicon carbide and silicon nitride. The blanks are made to dimensions slightly larger than the desired dimensions of the bearing elements so they can later be precision ground to the exact desired diameter. The cast blanks are treated in a hot isostatic press to consolidate the material. The Nitinol cube blanks and ball blanks may be heat treated to reduce their hardness from about 62 RC as cast to about 35–40 RC but for some materials and abrasive combinations, the cube blanks are left hard for more rapid corner and edge rounding in the subsequent tumbling operation. The cube blanks are tumbled in an abrasive tumbling machine to round the corners and edges enough to allow them to roll in a ball grinder. The rounded cube blanks and cast ball blanks are ground on conventional grinding equipment to the desired dimensions. Rods for roller elements of roller bearings may be cast in larger diameters and then heated and drawn or extruded to near the desired outside diameter before grinding, or cast in near net size and then ground to the precise diameter desired. The rods may be ground in a centerless grinder and cut to the desired length of roller elements after grinding. If tapered roller elements are desired for thrust bearings and the like, they may be cut initially to length and centerless ground individually to the desired taper. The balls may be cast in an investment casting process as a "string-of-beads" or grid which can be cut or broken apart after casting to produce the individual balls, ready for grinding and lapping in the conventional ball grinding and lapping equipment. The cast balls are preferably cast each with its own individual gate and riser to avoid the creation of voids during cooling in the mold. The use of feeder channels of sufficient cross-section in cast ball tree grids is desirable to produce good quality ball blanks. After grinding, the ground blanks are heat treated to produce the desired toughness and hardness, e.g. 58 RC. No final grinding is necessary after the second heat treat because, unlike steel roller elements, the size and shape of the ground elements does not change during heat treatment, so the final grinding step necessary with conventional bearing elements may be entirely eliminated.

DESCRIPTION OF THE DRAWINGS

The invention and its many attendant benefits and advantages will become better understood upon reading the following detailed description of the preferred embodiments in conjunction with the following drawings, wherein:

FIG. 1 is an elevation of a "string of beads" wax form for casting a string of Nitinol linked balls in accordance with this invention, and also shows a string of Nitinol balls made in the casting operation;

FIG. 2 is a schematic elevation of a hot isostatic press in which cast ball blanks are treated to consolidate the material;

FIG. 3 is an elevation of a single cast Nitinol ball made by the casting process of this invention;

FIG. 4 is a schematic process diagram of the heating steps to produce a medium hardness, highly elastic condition of Nitinol balls in preparation for grinding in accordance with this invention;

FIG. 5 is a schematic elevation of a Nitinol ball, heat treated in FIG. 4, being ground;

FIGS. 6 and 7 are schematic elevations of a heat treating and quenching process to produce a high hardness condition in the ground ball;

FIG. 8 is a schematic representation of a polishing and/or lapping apparatus for producing the final dimensions and a fine finish on the balls after treatment in the apparatus of FIGS. 6 and 7;

FIGS. 9 and 10 are schematic representations of an oven and a quench bath for producing the desired final hardness and ceramic surface material on the lapped and polished balls from the apparatus in FIG. 8;

FIG. 11 is an elevation of the a ball produced by the processes and apparatus represented in FIGS. 1–10;

FIG. 12 is a perspective view of an ingot of material to be made into balls;

FIG. 13 is a perspective view of a plate of material to be made into balls;

FIG. 14 a perspective view of an industrial laser cutting cubes from th plate shown in FIG. 13;

FIG. 15 a schematic representation of an abrasive tumbling machine in which the cubes cut from the sheet as shown in FIG. 14 are tumbled to produce "rounded cubes" shown in FIG. 16;

FIG. 16 is a perspective view of a "rounded cube" produced in the tumbler of FIG. 15;

FIG. 17 is a schematic block representing a conventional ball grinder;

FIG. 18 is a spherical ball ground in the ball grinder of FIG. 21;

FIG. 27 is a perspective view of a Nitinol rod for a roller bearing element in accordance with this invention;

FIG. 28 is a schematic diagram of a rotary swaging operation on the rod from FIG. 27;

FIG. 29 is a schematic diagram of a centerless grinding operation on the Nitinol rod from FIG. 27 or FIG. 28;

FIG. 30 is a schematic diagram of a rod polishing operation on the ground rod from FIG. 29;

FIG. 31 is a schematic diagram of a roto-lase cutting operation in which the rods from FIG. 30 are laser cut into individual roller elements;

FIGS. 32 and 33 are schematic diagrams of the heating and quenching process for hardening and producing the hard ceramic surface material on the roller elements;

FIG. 34 is a perspective view of the roller element produced by the process shown in FIGS. 27–33 ready for use or for final polishing FIG. 35 is a perspective view of a cast Nitinol tube used to make Nitinol races in accordance with this invention;

FIG. 36 is a schematic representation of a bearing race being cut by band saw from the tube shown in FIG. 35;

FIG. 37 is a perspective view of the bearing race cut from the tube as shown in FIG. 36;

FIG. 38 is a schematic representation of a heat treating oven for heating the race blanks from FIG. 37 to a medium hardness ultraelastic condition in preparation for the machining in FIG. 39;

FIG. 39 is a schematic representation of a machining step for the race blanks from the heat treating oven in FIG. 38;

FIG. 40 is a schematic representation of a grinding operation on the machined race blank from FIG. 39;

FIGS. 41 and 42 are schematic representations of heat treating and quenching steps to produce the desired hardness and ceramic finish on the races ground in FIG. 40; and FIG. 43 is a schematic representation of the polishing step to produce the final surface finish on the races from FIGS. 41 and 42.

DETAILED DESCRIPTION OF THE PREFERRED EMBODIMENTS

Figure 1A:
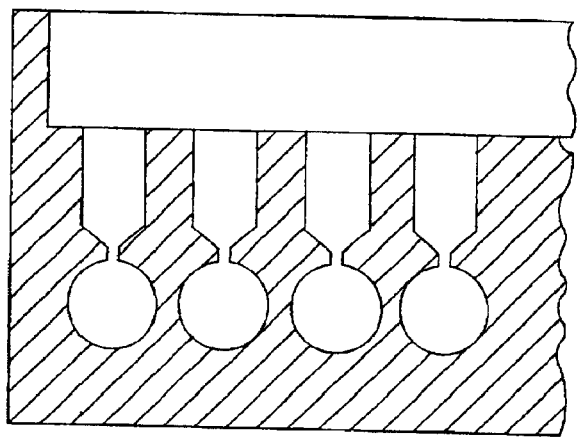
FIGS. 1A and 1B are sectional elevation and perspective views of a mold for producing balls, each with its own riser and gate.

Turning now to the drawings, wherein like reference characters designate identical or corresponding parts, and more particularly to FIGS. 1–7 thereof, a process for making Nitinol ball bearing elements, shown schematically in flow diagram form, uses an investment casting process in which a wax form 30 in the form of a "string of beads" is made or purchased as a separate item. The wax form 30 is suspended in a container, not shown, and the container is filled with a fine granular ceramic powder surrounding the wax form 30. The ceramic powder has a binder that binds the power into a mold when heated, after which the wax is melted and poured out of the mold, leaving only a ceramic mold with a "string-of-beads" hollow core.

The ceramic mold may be preheated in an evacuated heater container to prevent premature quenching and freezing of the molten Nitinol during casting. The molten Type 60 Nitinol, an intermetallic composition made of about 60% nickel and 40% titanium by weight, is poured from a vacuum oven into the hollow core of the mold. Type 60 Nitinol has a low viscosity when heated to above its melt temperature of about 1310° C. and flows easily into the mold, filling it completely.

The ceramic mold filled with Type 60 Nitinol is allowed to cool and solidify into a string-of-balls form 35, also shown in FIG. 1 since it is identical to the wax string-of-beads mold 30. Removal of the Nitinol string-of-beads form 35 from the ceramic mold is accomplished by disintegrating the mold, typically by breaking the mold into fragments using ultrasonic or conventional impactors. The mold is intentional made frangible, so it fragments readily. The Nitinol string-of-balls 35 is removed from the mold fragments and is cleaned of mold fragments. Alternatively, the mold can be made of a material that disintegrates when placed in a solvent, which facilitates removal of the Nitinol form from the mold.

Figure 1B:
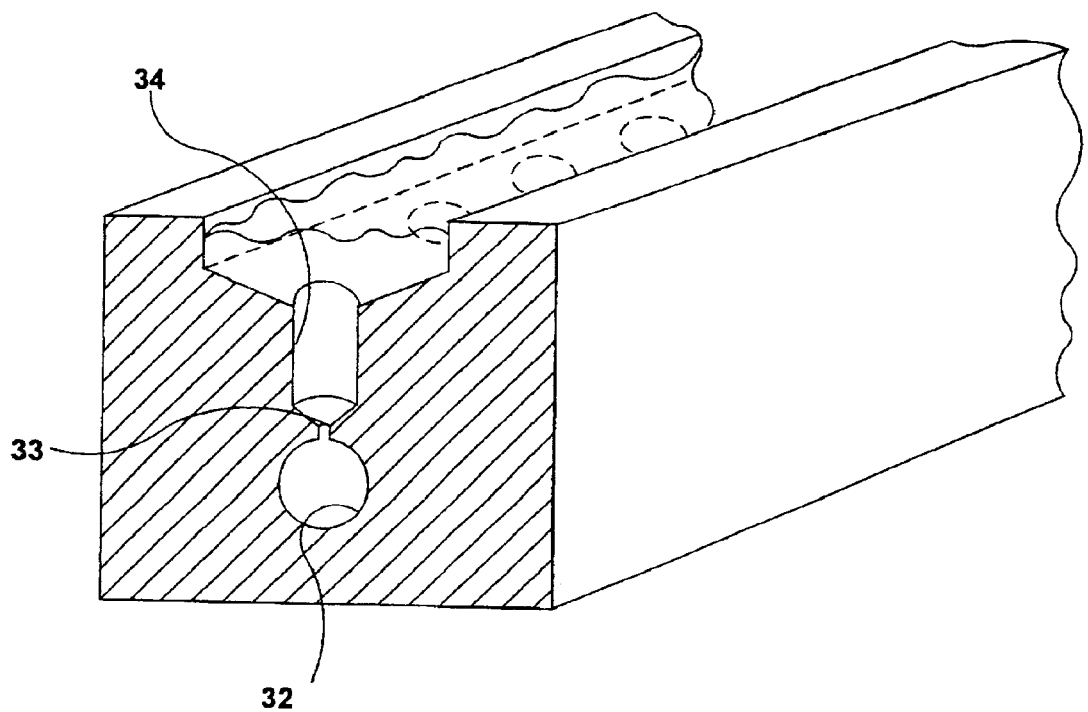

The cast balls 40 sometimes develop a void in the center, believed to be due to the shrinkage of the casting in the molds. The void weakens the ball and lowers its load carrying capacity. A technique for avoiding the creation of voids and porosity in the balls during casting is to provide each ball cavity 32 with its own individual gate 33 and riser 34 depending from a main channel supplied with molten Nitinol in a "branch of apples" form as shown in FIGS. 1A and 1B. The gate 33 and riser 34 are made of sufficient diameter to prevent premature hardening of the molten Nitinol in the gate during cooling so that molten material may be drawn into the ball 40 as it cools. Also, when the balls are removed from the molds, the gates are left attached to the ball blanks during processing in a hot isostatic press 43, as described below. Balls made and processed in this way have been found to be free of voids and porosity and much less susceptible to cracking or breaking under heavy loads.

Figure 1C:
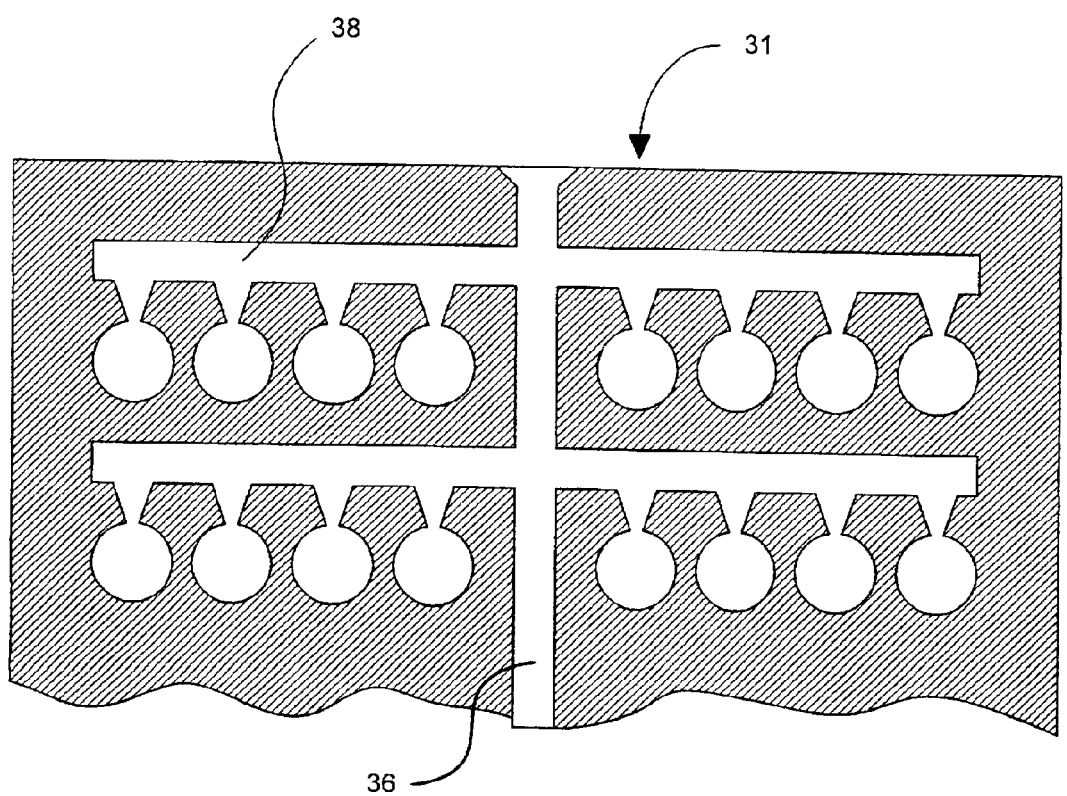
FIG. 1C is a sectional plan of a mold for making a wax ball tree form used in a lost wax casting process for casting balls in accordance with this invention.
Figure 1D:
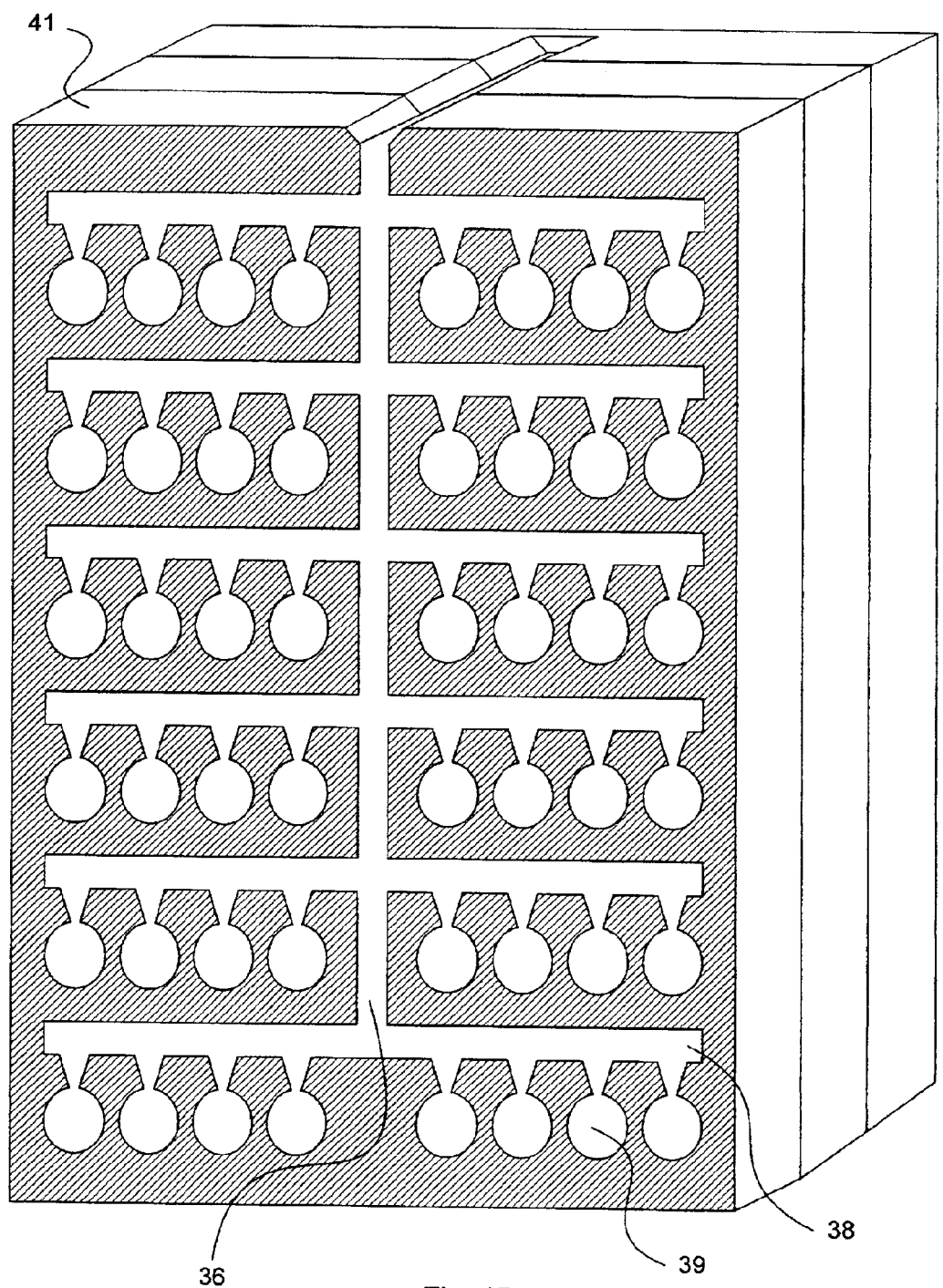
FIG. 1D is a stack of ceramic mold slabs made using the wax ball trees made in the mole shown in FIG. 1C for casting balls.
Figure 7A:
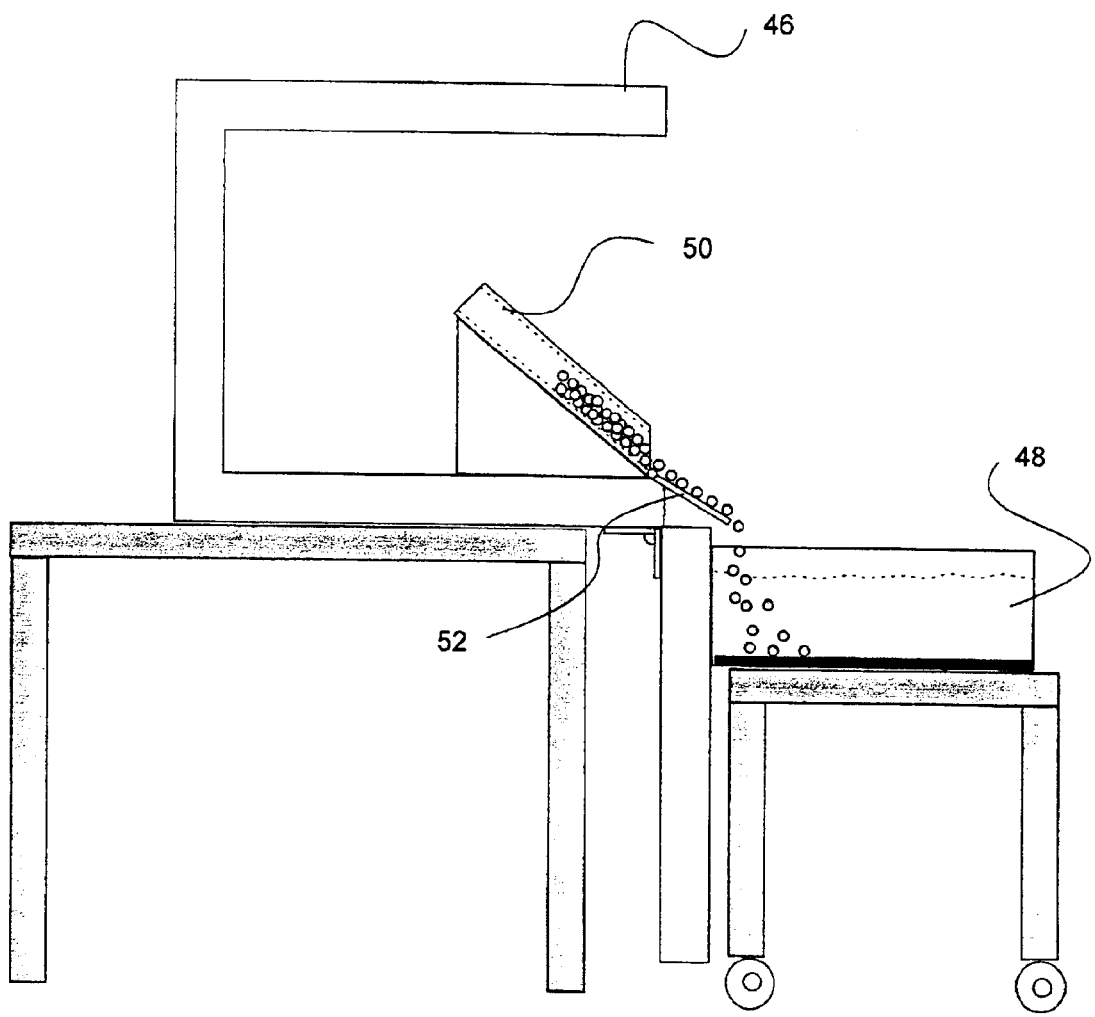
FIG. 7A is a schematic elevation of the oven and quench bath to produce desirable hardness in the Nitinol balls represented in FIGS. 6 and 7, showing one scheme for providing rapid transit from the oven to the quench bath.
Figure 19:
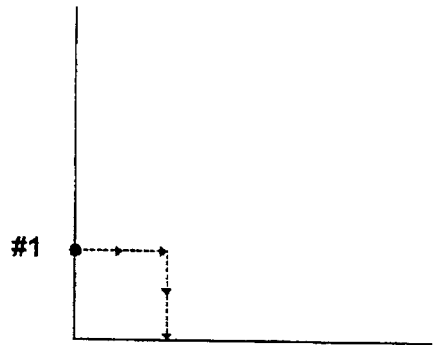
FIGS. 19–22 are plan views showing a laser cutting pattern for cutting cubical ball blanks from the sheet shown in FIGS. 13 and 14.
Figure 20:
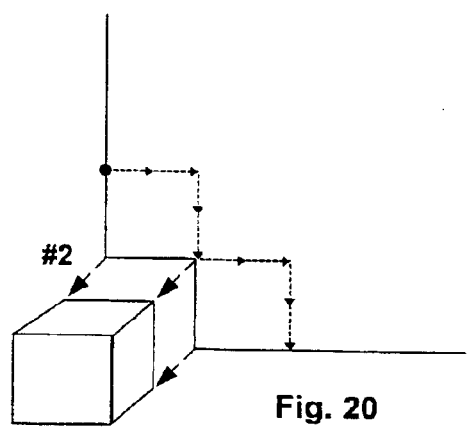
Figure 21:
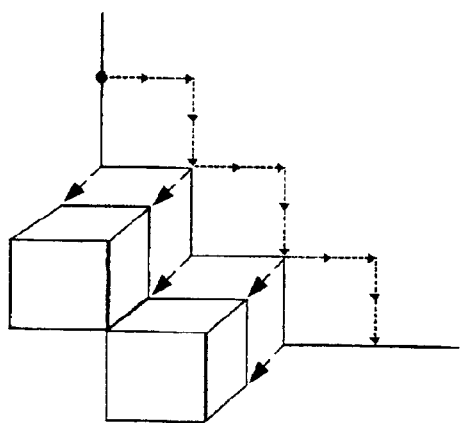
Figure 22:
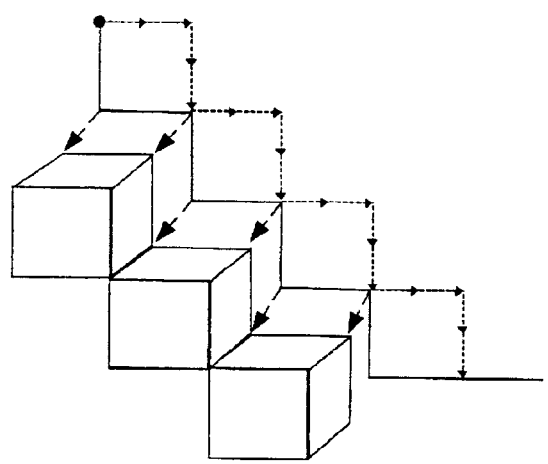
Figure 23:
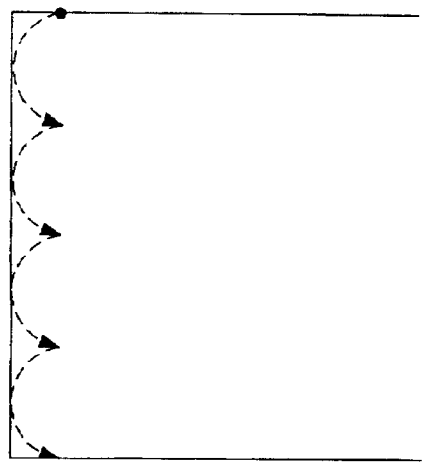
FIGS. 23–26 are plan views showing a laser cutting pattern for cutting cylindrical ball blanks from the sheet shown in FIGS. 13 and 14.
Figure 24:
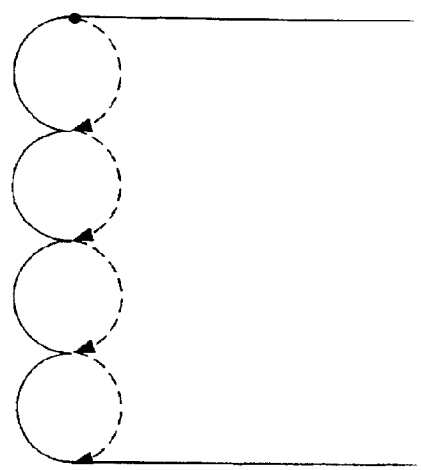
Figure 25:
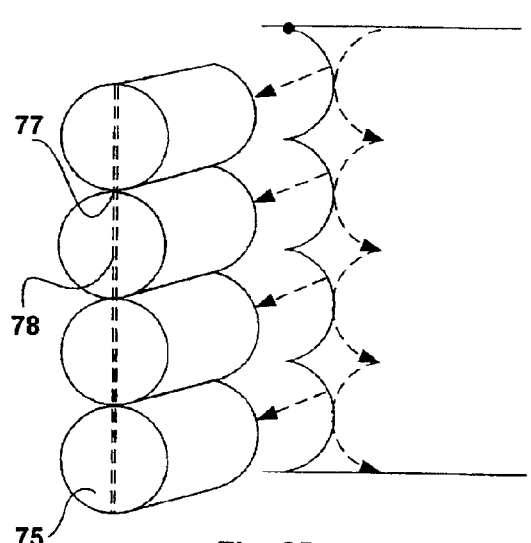
Figure 26:
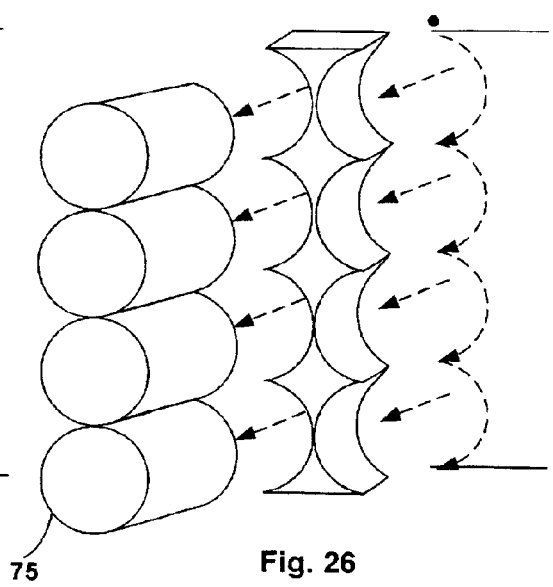

A high volume arrangement of the casting scheme shown in FIGS. 1A and 1B is shown in FIGS. 1C and 1D. A ball tree mold 31 is shown in FIG. 1C for casting wax ball tree forms for ⅝" balls, although this same arrangement would also work as well for balls of other diameters. The wax form for the ball tree has a central trunk 36 and branches 38 extending from the trunk 36, each with multiple balls 39 depending from the branches 38. The ball tree mold 31 for casting the wax ball trees is a split metal mold, usually aluminum. After removal from the ball tree mold 31, the wax ball tree forms are dipped in the ceramic slurry to make individual ceramic mold slabs 41 encasing the wax ball tree forms, as shown in FIG. 1D. After setting, the ceramic mold slabs 41 are flash heated to melt the wax which is poured out of the ceramic slab mold. A multiple-slab stack of slab molds 41 is assembled in a heated, evacuated chamber with their inlets aligned, and molten Nitinol is poured into the inlets from which it flows freely down the trunks 36, into the branches 38, and fills the individual ball cavities 39.

To further reduce the chances of voids in the center of the balls and ensure that the ball has its full load carrying capacity, the balls are subjected to heating under high pressure in a hot isostatic press 43, shown schematically in FIG. 2, a procedure know as HIPPING. Two hours at 1650° F. ±25° F. at 15,000 psi consolidates the material in the balls, removing any center voids without distorting the balls. Preferably, the gates and risers are not removed from the ball blanks until after HIPPING to improve the elimination of voids and porosity in the hot isostatic press. Preferably, the entire ball tree, or the branches 38 after being cut or broken from the trunks 36, can be treated in the hot isostatic press before removing the ball blanks 39, 40 from the string or branch.

After HIPPING, the ball blanks 39, 40 are broken or cut from the ball forms, in its form as a string-of beads as shown in FIGS. 1 and 2, or the "branch of apples" form shown in FIGS. 1A and 1B, or the tree or branches shown in FIG. 1D, to separate the connected balls into individual balls 39, 40 as indicated in FIG. 3. The connecting links 37 between the ball blanks 40 are broken or cut, or the ball blanks 39 are cut free of the branches 38 to free the individual ball blanks. Type 60 Nitinol in the as-cast condition is quite brittle and the links 37 and gates and risers 33/34 break easily. The length of the links 37 is preferably made short to facilitate cutting and waste as little material as possible. They can be made exactly as long as the thickness of a diamond or other abrasive saw that can be used to cut the balls out of the "string-of-beads" or branches 38, or even shorter if they are to be broken apart. The links 37 and branches may be as small as about ⅛" diameter to accommodate the flow of molten Nitinol through the mold. Preferably, the links 37 and branches 38 are about 3/16"×3/8" in cross section which provides ample flow area for the molten Nitinol to reach and fill all the spherical cavities 39, 40. A significant quantity of material is used in the trunks 36 and branches 38 of that cross-section, but it can be recovered and re-melted, so it is not wasted. Type 60 Nitinol of that cross-section in the as-cast condition can be broken, sometimes even in the process of removal from the mold, although I prefer that the gates and risers remain on the ball blanks for HIPPING. Sawing, especially gang sawing after HIPPING, has the advantage of producing a smooth cut surface. If the links are broken instead of cut, the broken ends of the links 37 can be ground flush with the balls using a belt grinder with 180 grit silicon carbide abrasive particles. It is desirable to have the balls 40 be as smooth and spherical as possible for the subsequent ball grinding operation, although some amount of projections of stubs from links or gates and risers is acceptable.

Heat Treating for Ultra elasticity

Balls for ball bearings must be ground to produce a smooth spherical surface. The Nitinol ball bearing blanks 40 may be ground in the as-cast condition in a conventional ball grinding machine 42 shown schematically in FIG. 5, but Type 60 Nitinol in the as-cast condition is very hard, on the order of 62 RC, so grinding could be slow and could produce rapid wear of the grinding equipment 42. Moreover, as-cast Type 60 Nitinol is brittle and can be cracked or broken by impacts. Therefore, I prefer to perform an initial heat treating step on the balls blanks 40 before grinding to reduce the hardness of the Type 60 Nitinol to about 42–49 RC and to give the material an elasticity greatly exceeding as-cast Nitinol and even most other metals. This first heat treat process includes healing the ball blanks in a vacuum oven 46, shown schematically in FIG. 4, to about 700° C. and holding at that temperature for about an hour to ensure thorough heating of the balls 40, then letting the balls cool slowly in the oven, preferably overnight to ensure against sudden undesirable cooling by premature opening of the oven. Preferably the oven is a metal-lined vacuum oven or inert atmosphere oven to ensure that the bearing elements remain clean during heat treating to avoid the necessity of cleaning them after heat treating. This treatment produces an elasticity up to about 6% which I have termed "ultrelasticity" to distinguish over the "superelasticity" of Type 55 Nitinol after cold working, but the ultraelasticity is not temperature sensitive like the superelasticity of Type 55 Nitinol.

After cooling, the heat treated ball blanks 39, 40 are subjected to a conventional ball grinding operation, illustrated schematically in FIG. 5, that is similar to the grinding performed on conventional balls used in conventional ball bearings. Because of the initial heat treating, the time to remove material from the cast ball blanks 40 is not much longer than for conventional steel balls. Early prototypes of cast Nitinol had surface pits that required removal by removing a surface layer of material, down to a level in which the pits were no longer present. Those surface pits are minimized by using a finer ceramic powder around the "string-of-beads" form 30 and the molds 41 when making the molds. It is a benefit to make the surface of the cast balls 40 is smooth and free of pits a possible. Also, the technique noted above of providing each individual spherical mold cavity 32, 39 with individual gates and risers of sufficient diameter avoids premature solidification of the molten Nitinol in the gates and risers while the molten Nitinol in the spherical cavities cools.

After grinding, the ground balls may be lapped and then polished in a conventional ball polishing machine 44, shown schematically in FIG. 6, preferably using a fine diamond slurry as the polishing medium, although conventional polishing compounds will also work, if somewhat slower. However, before the final lapping and polishing steps, I prefer to heat treat the balls in a second heat treatment to high hardness in the oven 46. In this second heat treatment, the balls are placed in a vacuum or inert atmosphere oven 46 and are heat treated to about 900° C. and held at the elevated temperature for about 2–3 hours or until they are heated entirely through. They are then removed from the oven 46 and immediately quenched quickly by immersion in water in a quench bath 48 and agitated in the water, giving them a of about 58–62RC, but without the brittleness exhibited by the ball blanks 39, 40 in the as-cast condition. Small balls can begin to air cool during transit from the oven 46 to the quench bath 48 and fail to reach the desired hardness produced by immediate water quenching from 900° C. An apparatus shown in FIG. 7A shortens the transit time from the oven to the water quench bath 48 by heating the balls in a steel tube 50 fitted with a hinged end cover fashioned in the form of a chute 52. After the balls have been heated to the desired temperature, the oven door is opened and the quench bath 48 is positioned directly in front of the oven door. The end cover/chute 52 is released to allow the balls to roll directly from the steel tube 50 in the oven 46 into the quench bath 48 without allowing time for the balls to air cool enough to prevent attainment of the desired hardness.

The lapping a polishing step noted above and represented by the apparatus 44 in FIG. 6 is performed on the palls to give then the desired exact dimensions and surface finish.

The lapped and polished balls are thoroughly cleaned with detergent and water, rinsed and dried. The balls 39, 40 may be used in the hardened condition following the second heat treating step, but I prefer to perform one additional operation to give them an integral gold or black ceramic surface which is very hard and can be polished to extreme smoothness. The ceramic surface forming step includes washing the balls 40 after polishing in detergent to remove all residues of polishing medium, and thorough rinsing to remove the detergent. The balls are carefully dried to avoid contamination and are placed in the oven 46, as illustrated in FIG. 7, for heating to about 950° C., or are heated by torch with a high temperature flame such as MAP gas to that temperature. The gold ceramic surface is attained at a lower temperature, on the order of about 600° C. The hot balls 39, 40 are then quenched as indicated in FIG. 8 by immersion in flowing water or oil. They may also be cooled by a forced draft of cold air, below 32° F., over the balls 40 to produce the black ceramic finish. The hard integral ceramic surface produced on the balls by this process is believed to be a complex mixture of oxides and nitrogen compounds of nickel and titanium. Thin surface layers are difficult to measure for hardness, but it is believed that the ceramic surface material is on the order of about 80 on the Rockwell "C" scale. It can be polished to an extremely fine surface finish if desired. It is electrically insulating, so it should not be used where electrical current through the bearing is needed. However, it improves the resistance to galvanic corrosion, which is caused by small electrical currents between dissimilar metals in the presence of an electrolyte. The ceramic surface can also be applied to Nitinol ball races, as described below, to enhance the resistance to galvanic corrosion to the bearing and to the structure in which the bearing is mounted.

The balls may now be processed with one final polishing step to produce a surface finish of less than one microinch rms, on the order of 0.2–0.5 microinch. If desired, the balls may be again subjected to the heating and forced cooling to thicken the ceramic surface.

Nitinol bearings, with or without the ceramic surface finish, are not subject to deterioration from contamination in petroleum based lubricants and can be lubricated with salt water, which makes them ideal and unique for marine applications. The bearings can also be run dry as they retain high hardness even at elevated temperatures. Tests have shown that Type 60 Nitinol can have a hardness of about 55 RC at an elevated temperature of about 600° C., a property unique among metallic materials.

The balls 39, 40 are useful as ball bearings, and also may be used in many other applications where hard and corrosion resistant balls are needed. For example, check valves having a spring-loaded ball are often used in flow circuits carrying corrosive liquids. The ball is subject to corrosion in that environment and can become inoperative as a sealing element in the check valve. A Nitinol ball in accordance with this invention solves the corrosion problem because Nitinol is virtually immune to corrosion by most corrosive agents.

The Cube Process for Making Balls

The casting process is best for large balls, on the order 0.5 inch and greater diameter. However, the casting process is less suitable for making smaller balls of the desired quality, so I have developed another preferred process for making balls of material like Nitinol which is difficult or impossible to form by conventional heading processes. This additional process is shown in FIGS. 12–27, wherein a billet or ingot 60 of the material, shown in FIG. 12, is rolled, cast, or otherwise formed into a plate or sheet 62, as shown in FIG. 13. As shown in FIG. 14, the sheet 62 is cut into cubical ball blanks 64 and the cubes 64 are reduced to rounded cubes 66, illustrated in FIG. 16, by abrasive tumbling in a conventional abrasive tumbling apparatus 68 shown in FIG. 15. The rounded cubes 66 are reduced to spherical balls 70, shown in FIG. 18, by grinding in the conventional ball grinder 44, illustrated schematically in FIG. 17.

There are many materials which cannot be formed into ball blanks suitable for ball grinding by known conventional forming processes. Stellite, high-nitrogen steel (known by the trade name "Cronidur"), and possibly silicon nitride are examples of such materials along with Nitinol. Although there is no known economical process for forming these metals into balls, they can be made in sheets or plates 62 by casting, rolling or other known techniques. I have discovered that balls can be made by cutting sheets of these materials into cubes 64 and tumbling the cubes in a tumbler 68 with large balls or grinding media, abrasive grit and a liquid carrier to remove the sharp edges and corners of the cubes 64, producing what I call a "rounded cube" 66 illustrated in FIG. 16. The rounded cube 66 can be ground to a sphere 70 in a conventional ball grinder 44 if sufficient material is removed from the corners and edges of the cube 64 to enable the "rounded" cube 66 to roll in the ball grinder 44. For example, cubes made of Type 60 Nitinol having six square sides, each 0.170" long, have been ground to make balls with a diameter of 0.156' or 5/32. A cube of those dimensions has a maximum corner-to-corner dimension of about 0.242", as measured. Reducing the corner-to-corner dimension in the abrasive tumbler by about 7% to about 0.225" provides sufficient rounding of the cube's corners and edges that it can be ground to a sphere 70 in a conventional ball grinder 44.

The cubes 64 can be cut from the sheet or plate 62 of Type 60 Nitinol by laser, following a pattern shown in FIGS. 19–22. As the cubes are cut out of the sheet, they fall through the support grid on which the sheet lies and fall into a pan below. The cubes 64 tend to bounce when they hit the bottom of the pan and the compressed gas from the laser head blows the small cubes out of the pan, so the bottom of the pan can be lined with a material such as felt impregnated with high temperature grease or a mesh material to reduce the tendency of the cubes to bounce and facilitates their capture and easy removal from the pan.

The laser cutting speed for cutting small ball blanks could be fastest if the sheet 62 were cut into a series of parallel bars by parallel cuts on one axis, and then into cubes by holding the bars together in a flat array in a jig and feeding the bar array into the laser for cutting the bars off at the end into cubes. Naturally, other laser cutting schemes and patterns will occur to those skilled in the art in light of this disclosure.

Although the industrial laser is an excellent tool for cutting Nitinol, there are other existing processes that could also be used. Abrasive water jet cuts Nitinol, although slower than a laser. EDM also cuts Nitinol, but it is even slower. I believe plasma cutting should be fast, although it may produce a wider kerf and more waste. The choice of the cutting process is a tradeoff of speed, cost and waste.

Another ball blank form from which balls can be ground is cylinders. A scalloped laser-cutting pattern, shown in FIGS. 23–26, uses matching semicircular cuts instead of squares to produce cylindrical ball blanks 75 instead of cubes 50. The diameter of the cylinders is equal to the thickness of the plate 48 so the three orthogonal dimensions through the center of the cylindrical ball blank 75 are equal, as is the case with the cubical ball blanks 64. The cylindrical ball blanks 75 have smaller corner and edge protrusions and would not require as much time in the tumbler to round off their edges to make them ready for the ball grinder. Indeed, the cylinders may not require any tumbling time at all. However, the laser time to cut cylinders is considerably longer than to cut cubes, and the yield of ball blanks from a sheet or plate of a given size would be less. The choice between the two cutting patterns would depend on the overall efficiency of the ball production process. The opposed semicircular matching laser cuts that produce the cylindrical ball blanks 75 can be left connected at the cusp 77 to produce a string of cylinders 75 connected by a small rib 78 at adjacent edges. The laser travel mechanism is accurate enough to leave a rib that is only a few thousandths of an inch thick allowing the cylinders 75 in the string of cylinders to be easily broken apart after cutting.

At least one manufacturer of Nitinol forms has indicated that it has plans to develop the processes to make drawn rod of Type 60 Nitinol. If they are successful, another process for making ball blanks would be to cut lengths of such rod equal to the rod diameter. This would produce cylindrical ball blanks like the cylindrical ball blanks 60. These cylindrical ball blanks would be processed by tumbling in an abrasive tumbler if required and ground in a ball grinder to produce spherical balls in the same manner as the process used to make spherical balls of the cylindrical ball blanks 60. The cost of the rod may be prohibitive and the process selected by the ball manufacturer would depend on the cost as well as the other usual factors which influence such decisions.

The Type 60 Nitinol rod would be virtually impossible to shear with tools that would last long enough to pay their cost, so other processes should be available to cut the Type 60 rod into short cylinders. I envision a "rotolase" laser cutter that rotates a cylindrical workpiece such as a pipe, and in this case a rod, under the laser beam to cut through the cylinder. Another approach would be to use ganged diamond cutter wires operating in staged fashion to cut simultaneously but cut off the end closest to the end of the rod first. There is little waste with a diamond wire cutter because the wire is so narrow and, even though it cuts much slower than a laser, the ganging of multiple wires acting on a single length of rod at once would produce a large number of cuts per unit time. The rod would be supported in a grooved and slotted support bar to hold it against deflection under load by the pressure of the diamond cutting wires against the rod. The rod could also be cut off in the desired lengths by plasma cutting, although there would be more waste using that process.

Drilling Holes in Hardened Balls

There are uses of balls that require a diametrical hole through the ball. Typically, such balls are now made as conventional ball bearing balls that are then drilled to make the hole. Because the drilling must be done on conventional steel balls after the ball is heat treated and reground, the balls are at full hardness when they are drilled, which makes drilling very slow and difficult. This invention provides an effective way to drill the hole in the Nitinol ball after it is heat treated to final hardness. The ground balls can be heated to a high temperature, on the order of 900° C.–950° C., and placed in split spherical die having an axial diametrical hole perpendicular to the parting plane of the die halves. The hot 60 Nitinol ball can be punched or, preferably, drilled while trapped and squeezed in the spherical die cavity using the through hole as a guide for the drill or punch.

Another preferred method of making hard, precision-ground balls with an diametrical through hole is to make the ball as noted above and position the finished and polished ball in a holding jig that has a support for an EDM stinger positioned axially aligned above the center of the ball. The stinger is energized and lowered into contact with the ball and cuts a diametrical hole exactly through the center of the ball. If the oxide finish is desired on the "drilled" ball, it should be applied after the hole has been made because the oxide is electrically non-conductive and would adversely affect the operation of the EDM stinger.

Roller Bearing Elements

Turning now to FIGS. 27–34, a process for making Nitinol roller elements for roller bearings, shown in flow diagram form, starts with an investment casting process similar to the ball casting process described above, but using a wax rod-form made by injecting molten wax into in a mold or purchasing it as a separate item since it is a standard size. The wax rod form is suspended in a container and the container is filled with a fine granular ceramic powder, surrounding the wax rod form. The ceramic powder is fixed in the shape encapsulating the rod, with a connecting channel, and the wax is heated and poured out of the mold, leaving only a ceramic mold with a cylindrical hollow core. The ceramic mold is preheated in the container to prevent premature quenching and freezing of the molten Nitinol which is melted and poured into the cylindrical core of the ceramic mold. The cylindrical core of the mold is filled with molten Nitinol and the ceramic mold is allowed to cool.

After cooling and solidifying, the Nitinol rod 80 cast in the ceramic mold is ready for removal from the ceramic mold. Removal is accomplished by breaking the mold into fragments using ultrasonic or conventional impactors, or the mold is otherwise disintegrated by solvents or the like. Center voids have not been seen to develop in the cast rods 80, but they may be treated in the hot isostatic press if voids are found to occur.

The Nitinol rod 80 may be made with other processes. They may be made by conventional casting processes by pouring in conventional split molds directly from the draw-down oven where the Type 60 Nitinol is initially made. These rods have the usual edge seam marking, but that is removed during the subsequent processing. Hot rotary swaging and drawing of larger cast ingots or rotary swaged ingots are other feasible processes for making the rods. However it is made, the rod 80 is machined to the desired diameter at a temperature of between 600° C. and 950° C., preferably at the upper end of that range for ease of machining and to achieve a better surface finish. Good grades of cutters are required for such machining, preferably grade 5–7 micrograin silicon carbides.

As an alternative to machining, the rods 80 may be mounted on the axis of a rotary forge 83, shown schematically in FIG. 28, which has a series of forging hammers 85 disposed in a circle around the axis of the machine. A suitable rotary forge machine is produced by American GFM Corp. in Chesapeake, Va. The Nitinol rod 80 is heated by torches, shown schematically at 87, induction heaters, radiant heaters or the like to a high temperature of about 800° C. –950° C. and hammers 85 are driven against the Nitinol rod 80 while the rod 80 is axially advanced and rotated through the ring of hammers 85. The faces of the hammers are oriented to swage the Nitinol axially and not circumferentially. The rod 80 may be passed repeatedly through the rotary forge apparatus 83 until the length of the rod 80 has increased and the diameter has been reduced to nearly the desired diameter of the roller elements to produce a semi-finished rod 90 from which the roller elements can be made.

It may be advantageous for producing a smooth cylindrical rod 90 to perform a hot drawing operation. The rotary forged rod 90 is heated to about 800° C. and is drawn through one or a series of circular dies, each slightly smaller than the previous one. Preferably, the circular dies are made of Type 60 Nitinol to avoid quenching the rod 90 as it is drawn through the die. The Nitinol bar 60 is reheated to the desired temperature of about 800° C.–950° C. between each drawing step. Only a very slight reduction in diameter for each pass is accomplished to preserve the tooling and produce the desired smooth cylindrical form.

After the final diameter reduction operation, the Nitinol rod 90 allowed to cool to room temperature, and the rod 90 is removed to a centerless grinder 95, shown in FIG. 29, for centerless grinding to almost the exact desired diameter of the roller bearing elements. It is left slightly oversized to allow a small amount of material from the individual roller elements at their ends to be removed for producing crowned rollers, if desired, and in the subsequent polishing operation.

The ground, perfectly cylindrical rod 90 is removed to a rod polishing machine 100, shown in FIG. 30, which may be similar to a centerless grinder using buffing wheels instead of grinding wheels. The rod 90 is polished to a smooth surface finish on the order of 1 microinch. It is then removed to a cutting operation, shown in FIG. 31, preferably an automated roto-ase cutting machine having a rod support that rotates the polished rod 90 under the laser to cut it cleanly into properly sized roller bearing element blanks 105 without significant waste of material. The cut roller bearing element blanks 105 may be edge trimmed to chamfer and polish the ends of the blanks 105 to produce finished roller elements 110. The finished roller elements 110 are heat treated by heating in a oven to about 800° C.–950° C. for 2–3 hours, and are quenched in a water bath to produce a deep hardening to about 60–62RC to at least ½", and produce an integral ceramic finish that is on the order of about 80RC hard. The roller bearing elements may be repolished to produce a surface finish of less that 1 microinch RMS.

Bearing Races

Inner and outer bearing race components are manufactured from investment cast tubular blanks 115, shown in FIG. 35, made of Type 60 Nitinol. The blanks 115 are made with an outside diameter that is oversize by 0.010"–0.050" to allow machining and grinding the blanks to the precise dimensions required for a particular bearing application. The tubes 115 are heat treated to the ultraelastic condition noted above to produce a hardness of about 40–49RC and a highly elastic crystalline structure that resists breakage during handling. The process described herein produces the bearing race assemblies.

Race blanks 120, shown in FIG. 37, are cut from the cast tubes 115 by a rotary laser cutter mentioned above, or by sawing with a carbide band saw 122, as shown in FIG. 36. The band saw speed is slower than normal to prevent damage to the saw and the tube may be heated to about 900° C. to speed the cutting rate. If not done previously, the race blanks 120 may be heat treated in the oven 46, shown in FIG. 38, to a temperature of about 700° and air-cooled or furnace-cooled to medium hardness (47 to 50 Rc). In this condition the blanks 120 can be machined and ground to size with minimal difficulty. However, the blanks can be heat treated to have high hardness prior to performing the machining and grinding processes. The heat treatment process required to obtain high hardness is described below.

Nitinol 60 is most satisfactorily machined with carbide tools 124, shown schematically in FIG. 39, using moderate speeds, light feeds and highly chlorinated cutting oils. The material can also be machined without the use of cutting oils. However, care must be taken to deflect the particles removed, as they are hot and sharp. Carbide tools can wear rapidly and the edges of the cutters will roll quickly. All carbide cutting tools should be sharpened or replaced often. A good indication of tool wear is when high pitch noise is generated during turning. The machining may also be done at high temperature, on the order of 900° C., which allows much faster removal of material and produces a very smooth cut surface.

Grinding, employing silicon carbide wheels 126 shown in FIG. 40, is a highly satisfactory means of machining 60 Nitinol. The ball groove around the interior of the race blank may be ground to extremely fine tolerances in Nitinol because it is a very stable material. Very fine finishes are possible through very careful control of the grinding conditions. Lapping of the final finish with diamond film also produces superior finishes. A finish of less than 1.0 micro-inch RMS is obtainable on the material.

Nitinol 60 can be heat treated to have high hardness (58 to 62 Rc). The bearing races should be machined close to the required dimensions in the medium hardness ultraelastic condition then heat treated and quenched for high hardness as indicated in FIGS. 41 and 42 prior to the final grinding operations. Another option is to heat treat the components prior to any machining operations. To obtain high hardness, oven the components are heated in the oven 46 and heated to 900° C. to 950° C. and allowed to soak at that temperature for at least 15 minutes. They are then quenched in water in the quench bath 48. The time between removal from the oven and quenching is critical, especially for small races, so the quench bath should be located as close to the oven as possible. The quenching from 900° C.–950° C. will produce a black ceramic surface finish on the races.

Type 60 Nitinol can be polished to a high luster finish of less than 0.5 microinch RMS. The use of diamond paste on a polishing or buffing wheel 128 is recommended, although standard polishing compounds such as jeweler's rouge will work. Diamond paste called Glanz Wach has been found to provide excellent finishes on the material. The paste is manufactured by Menzerna-werk at P.O. Box 60 76468 Otigheim, Germany, Tel: +49 (7222) 91 57 0 Fax: +49 (7222) 91 57 10. Bars of the paste can also be purchased from Ralph Maltby's *The GolfWorks* catalog at 1-800-848-8358. Polishing of the material as machined and ground is acceptable as is polishing of any applied oxide finish.

The oxide finishes applied to Nitinol 60 provide some advantages over the non-oxide coated material. The oxide (a ceramic) is an electrical isolator, increases the surface hardness to an estimated 70RC–80RC (from the 62 RC hardness of the base material). The oxide somewhat improves the corrosion resistance and provides a lower coefficient of friction. The oxide also produces an attractive visual appearance, especially the gold finish. Final polishing of the oxide using the above described compound improves the appearance and produces a smoother surface finish. Gold and black finishes are readily attainable, but other colors are also possible, such as blue, green or purple. However, a separate the heat treatment necessary to attain these colors requires very careful control and is probably not worth the effort in an industrial product.

The process for applying the black oxide is the simpler of the two processes. The black oxide is applied after the components are machined and ground to size. The components are machined, ground to size and polished, if the final component is to be polished. The components are heated to the 900 to 950° C. temperatures as described for the high hardness heat treatment process described. The components are then water quenched. The black oxide will be formed at the same time as the high hardness is obtained. The components are then re-polished using the diamond paste compound.

The gold oxide is applied on the components upon completion of the final manufacturing process. In other words, the components are heat treated for high hardness, machined and ground to the final dimensions and then polished. The gold oxide requires a polished surface. The gold oxide is formed by a low heat treatment process. This procedure does not change the hardness of the finished components, as long as they are not overheated.

The gold color can be of different shades, from light to dark gold, or almost brass in color. The different shades are obtained by controlling the amount of heat and the duration of exposure. The gold oxide application process is monitored visually, but an automated process to allow precision application of the shades of gold is feasible.

As noted above, the components must be cleaned thoroughly with a strong detergent and rinsed well in fresh water to remove all residue of cutting oil, polishing compound, fingerprints, etc. from the components prior to application of the oxides. These contaminants would produce discoloration and blotches on the parts if they were heated to a high temperature without being cleaned. After cleaning, the components should be handled with clean cotton gloves to avoid contaminating the clean surface with fingerprints.

The completed components are placed onto a material having low thermal conductivity such as firebrick, ceramic plate or a 60 Nitinol plate. Using a MAPP torch, the components are heated slowly until the gold oxide starts to form. Heat must be applied evenly to obtain a uniform color tone. When the desired color is obtained, the heat is removed and the component is allowed to air cool. It is not water quenched. If a component starts to turn a purple color, the temperature is too high and the component will have to be reprocessed for high hardness, then polished and the gold oxide process repeated.

The processes disclosed herein make possible for the first time the manufacture of ball and roller bearings with Nitinol bearing elements. The high strength and chemical inertness or non-reactivity of Nitinol make it a very desirable material for bearing elements, especially for applications in chemical and refining plants, ships and other applications in and around salt water, geothermal power plants, and many food processing, aerospace and defense applications where contaminants and corrosive agents and cleaning solutions are present, to name just a few of the myriad possibilities.

Obviously, numerous modifications and variations of the preferred embodiment described above are possible and will become apparent to those skilled in the art in light of this specification. For example, the balls made of Type 60 Nitinol in accordance with this invention have many other applications in addition to ball bearings, such as ball valve elements in corrosive or hot applications, e.g. check valves for corrosive liquids, or valve elements and valve lifters for internal combustion engines. Moreover, many functions and advantages are described for the preferred embodiment, but in many uses of the invention, not all of these functions and advantages would be needed. Therefore, I contemplate the use of the invention using fewer than the complete set of noted features, benefits, functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein

I claim:

1. A bearing for supporting a rotating shaft, comprising:
a multiplicity of rolling bearing elements radially positioned between said shaft and a supporting structure;
wherein said rolling bearing elements include a elements made of Type 60 Nitinol.

2. A bearing as defined in claim 1, wherein:
said rolling bearing elements include rods made of Type 60 Nitinol.

3. A bearing as defined in claim 1, wherein:
said rolling bearing elements are spheres made of Type 60 Nitinol.

4. A rolling element bearing for supporting a rotating member comprising:

a multiplicity of rolling bearing elements radially positioned between said member and a supporting structure; and a bearing race including an annular ring of Type 60 Nitinol free of substantial expressive prestress.

5. A process for making Nitinol rolling bearing elements of a desired shape, comprising:
making a ceramic mold having a cavity with an internal shape like said desired shape of said rolling bearing elements;
pouring molten Nitinol into said cavity;
cooling said mold and said Nitinol in said cavity to produce a solidified Nitinol form; and disintegrating said mold to remove said Nitinol form;
heating said Nitinol form to an elevated temperature in a range of about 800° C.–950° C., and;
rotary forging said Nitinol form at said elevated temperature to produce a hot-worked rod having a diameter slightly greater than the desired diameter of said rolling bearing elements.

6. A process for making balls, comprising:
selecting a sheet or plate of said Type 60 Nitinol;
cutting ball blanks out of said sheet or plate; and
grinding said ball blanks in a ball grinder to a desired spherical shape and size.

7. A process as defined in claims 6, wherein:
said ball blanks are cubical in shape.

8. A process as defined in claim 6, wherein:
said ball blanks are cylindrical in shape.

9. A process as defined in claim 6, wherein:
said ball blanks are cut out of said sheet or plate by an industrial cutting laser.

10. A process as defined in claim 6, wherein:
said ball blanks have a center and six equal orthogonal dimensions through said center.

11. A process as defined in claim 10, further comprising:
tumbling said ball blanks in and abrasive tumbler to round off corners and edges of said ball blanks prior to grinding said ball blanks in said ball grinder.

12. A process for making Nitinol bearing races, comprising:
selecting a tube made of Type 60 Nitinol and having a central axis;
cutting bearing race blanks off said tube on a cutting plane perpendicular to said central axis; and
grinding or machining said race blanks to desired outside dimensions and interior configuration.

13. A process as defined in claim 12, further comprising:
heat treating said race blanks to about 900° C. and quenching to produce hardness of above about 58RC.

* * * * *